US009205779B1

(12) United States Patent
Liu

(10) Patent No.: US 9,205,779 B1
(45) Date of Patent: Dec. 8, 2015

(54) AUXILIARY MIRROR DEVICE FOR VEHICLES

(71) Applicant: Hsin-I Liu, Tainan (TW)

(72) Inventor: Hsin-I Liu, Tainan (TW)

( * ) Notice: Subject to any disclaimer, the term of this patent is extended or adjusted under 35 U.S.C. 154(b) by 0 days.

(21) Appl. No.: 14/608,230

(22) Filed: Jan. 29, 2015

(51) Int. Cl.
  *G02B 7/182* (2006.01)
  *B60R 1/078* (2006.01)
  *B60R 1/08* (2006.01)

(52) U.S. Cl.
  CPC ............... *B60R 1/078* (2013.01); *B60R 1/081* (2013.01)

(58) Field of Classification Search
  CPC ............ B60R 1/07; B60R 1/078; B60R 1/081
  USPC .......................................... 359/871, 872, 881
  See application file for complete search history.

(56) References Cited

U.S. PATENT DOCUMENTS 5,096,283 A * 3/1992 Croteau .................. B60R 1/081
   359/872

* cited by examiner

*Primary Examiner* — Euncha Cherry
(74) *Attorney, Agent, or Firm* — Alan D. Kamrath; Kamrath IP Lawfirm, P.A.

(57) ABSTRACT

An auxiliary mirror device for vehicles includes a fixation unit, a connection unit, and an auxiliary mirror. The fixation unit is adapted for coupling on a vehicle rear view mirror. The connection unit includes a connection rod coupled to the fixation unit, and a sleeve is engaged on the connection rod. A supporting rod disposed on the auxiliary mirror is received in the connection rod retractably. The connection unit further includes an adjustment barrel moveable relative to the sleeve and can be locked with of the sleeve. A tightening ring is engaged in the adjustment barrel and can be releasably compressed by the sleeve. A position of the auxiliary mirror relative to the side view mirror can be adjusted. When the auxiliary mirror is adjusted to a required position, the adjustment barrel can be operated for coupling and fixing the supporting rod and the connection rod together.

4 Claims, 7 Drawing Sheets

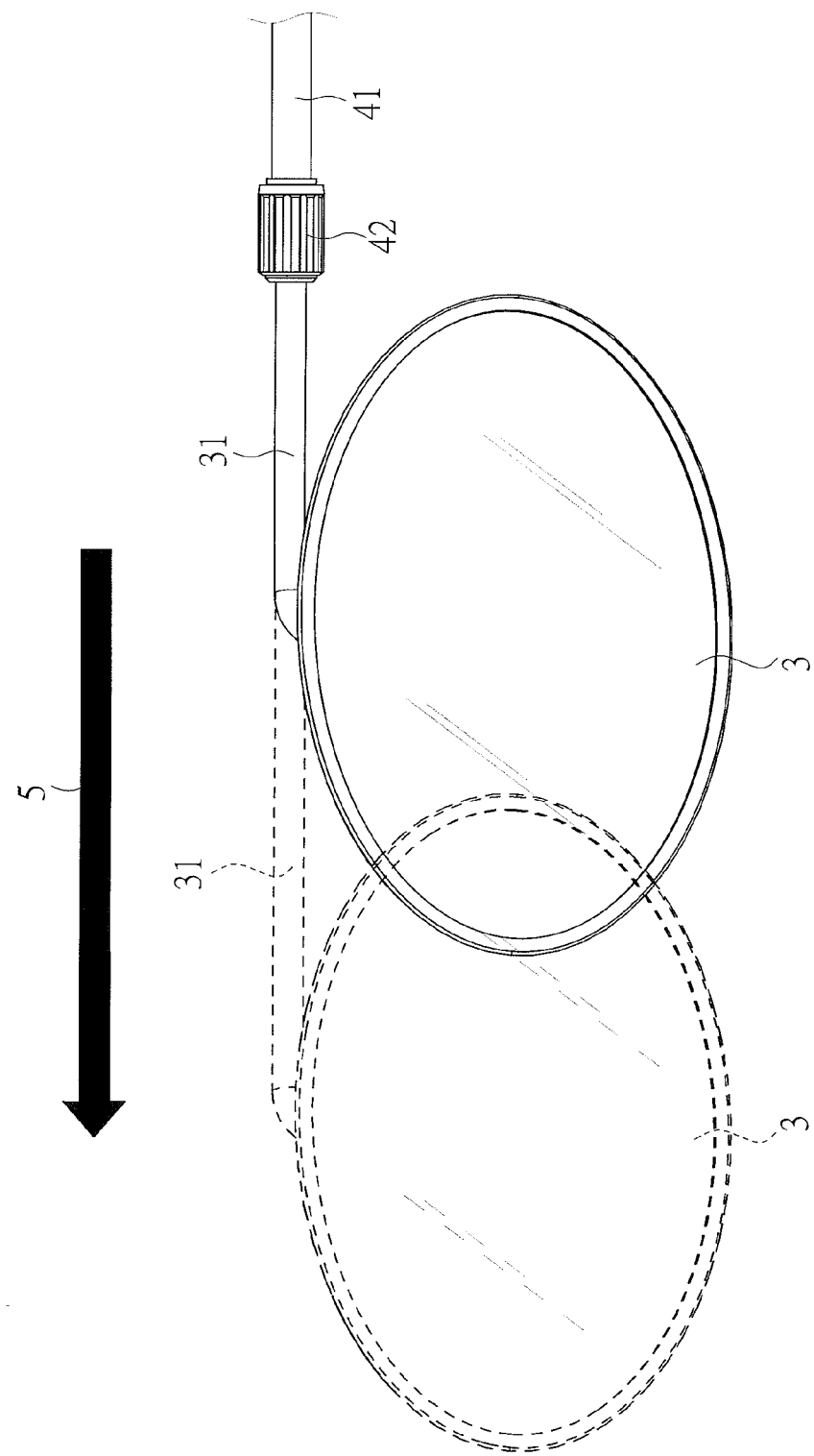

AUXILIARY MIRROR DEVICE FOR VEHICLES

BACKGROUND OF THE INVENTION

The present invention relates to an auxiliary mirror device for vehicles and, more particularly, to an auxiliary mirror device for coupling to a vehicle side view mirror.

A conventional way for additionally installing an auxiliary mirror to a vehicle side view mirror is to stick a convex mirror on the vehicle side view mirror for expanding the rear view range. However, because the convex mirror is fixed on the vehicle side view mirror, the driver will be unable to adjust a position of the convex mirror based on the actual conditions to have the most effective rear view angle and range. Furthermore, a size of the convex mirror is normally smaller than half of a size of the vehicle side view mirror. Thus, it will not be very effective for enhancing the rear view range. Additionally, object images reflected on the convex mirror are small which will require the driver to have excellent eyesight to see the rear object images clearly. The driving safety can not be effectively improved, because conventional auxiliary mirrors can not be easily adjusted by drivers to the most effective rear view position based on the actual conditions.

Therefore, an auxiliary mirror device for vehicles is required for improving the above mentioned problems and drawbacks.

BRIEF SUMMARY OF THE INVENTION

It is an objective of the present invention to provide an auxiliary mirror device for vehicles which can be detachably coupling on a frame of a vehicle side view mirror. The auxiliary mirror device includes an auxiliary mirror. Drivers will be able to adjust a position of the auxiliary mirror relative to the side view mirror based on the actual conditions in order to have the most effective rear view angle and range for enhancing the driving safety.

To achieve this and other objectives, an auxiliary mirror device for vehicles of the present invention includes at least one fixation unit, a connection unit, and an auxiliary mirror. The fixation unit includes a fixation base and a holder base engaged with the fixation base. The fixation base is adapted for coupling on a frame of a vehicle rear view mirror. The holder base has a through-hole. The connection unit includes a connection rod, an adjustment barrel, and a tightening ring. The connection rod includes a first section and a second section spaced from the first section along an axis of the connection rod. The first section of the connection rod is engaged in the through-hole of the holder base, and a connection hole is provided in the second section of the connection rod. A sleeve is provided on the second section of the connection rod and has a threading on an outer periphery thereof. A conic slot is formed in the sleeve. The adjustment barrel is mounted around and moveable relative to the sleeve. A screw hole is formed in the adjustment barrel and can be locked with the threading of the sleeve. The tightening ring is engaged on the adjustment barrel and includes an inner section received in the adjustment barrel. The inner section of the tightening ring includes a tapered outer surface having a conical shape corresponding to the slot in the sleeve. The auxiliary mirror is provided with a supporting rod disposed on a back thereof. The supporting rod extends through the tightening ring and the sleeve and is retractably inserted into the connection hole of the connection rod. When the adjustment barrel is locked with the threading of the sleeve, the inner section of the tightening ring is received in the slot of the sleeve and tightened by the sleeve, When the adjustment barrel is turned away and loosen from the threading of the sleeve, the tightening ring is moved away from the slot of the sleeve, and the supporting rod is moveable relative to the connection rod.

In a preferred form, a recess is provided in an inner wall of the connection hole of the connection rod and extends along the axis of the connection rod, and a projection is formed in a front end of the supporting rod and received within the recess of the connection rod.

In a preferred form, an annular combination rim is provided on the adjustment barrel, and an annular groove is provided in an outer periphery of the tightening ring and engaged with the combination rim of the adjustment barrel.

The present invention will become clearer in light of the following detailed description of illustrative embodiments of this invention described in connection with the drawings.

DESCRIPTION OF THE DRAWINGS

FIG. 7 is a schematic view illustrating a position of an auxiliary mirror of the auxiliary mirror device of the present invention being adjusted.

DETAILED DESCRIPTION OF THE INVENTION

Figure 1:
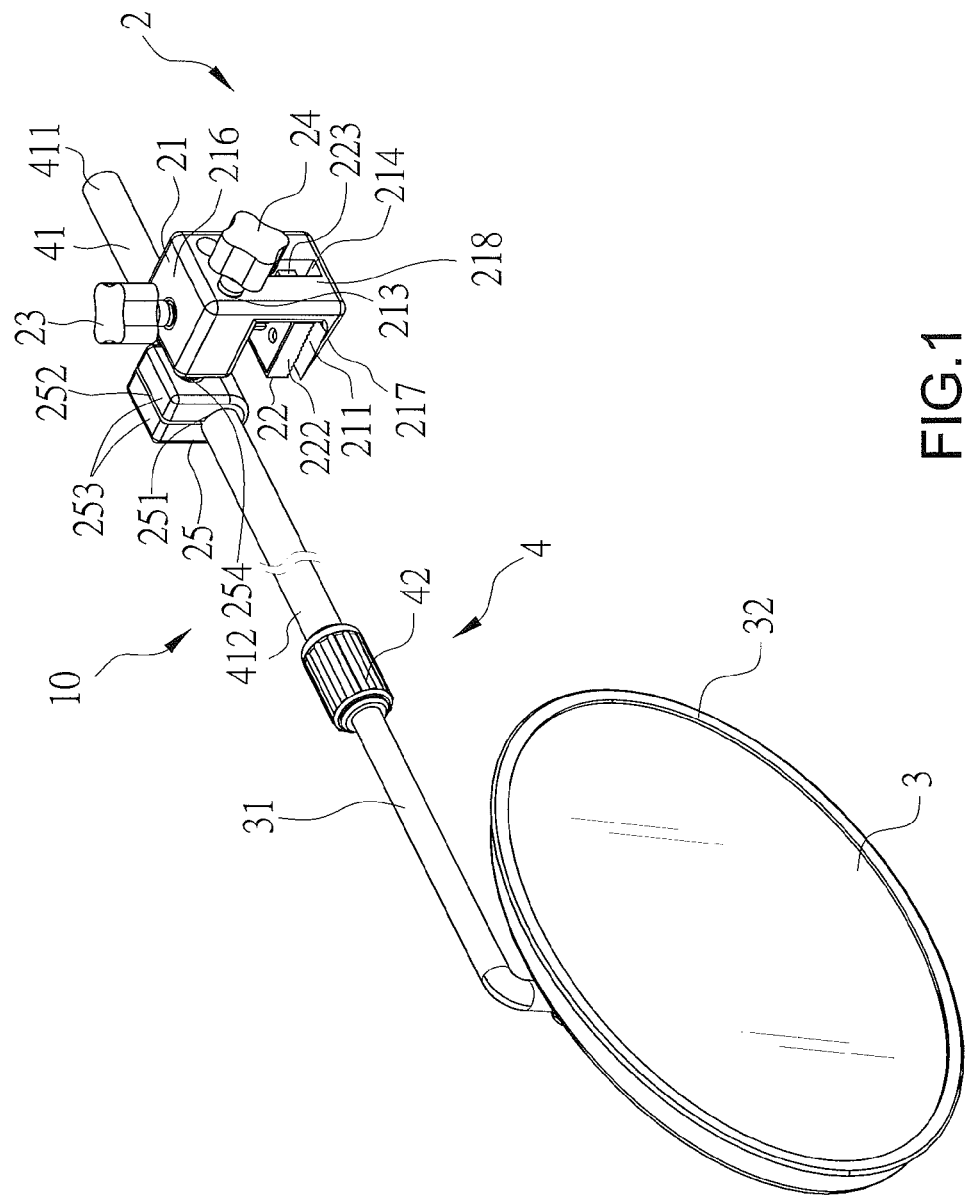
FIG. 1 is a perspective view of an auxiliary mirror device of the present invention.
Figure 2:
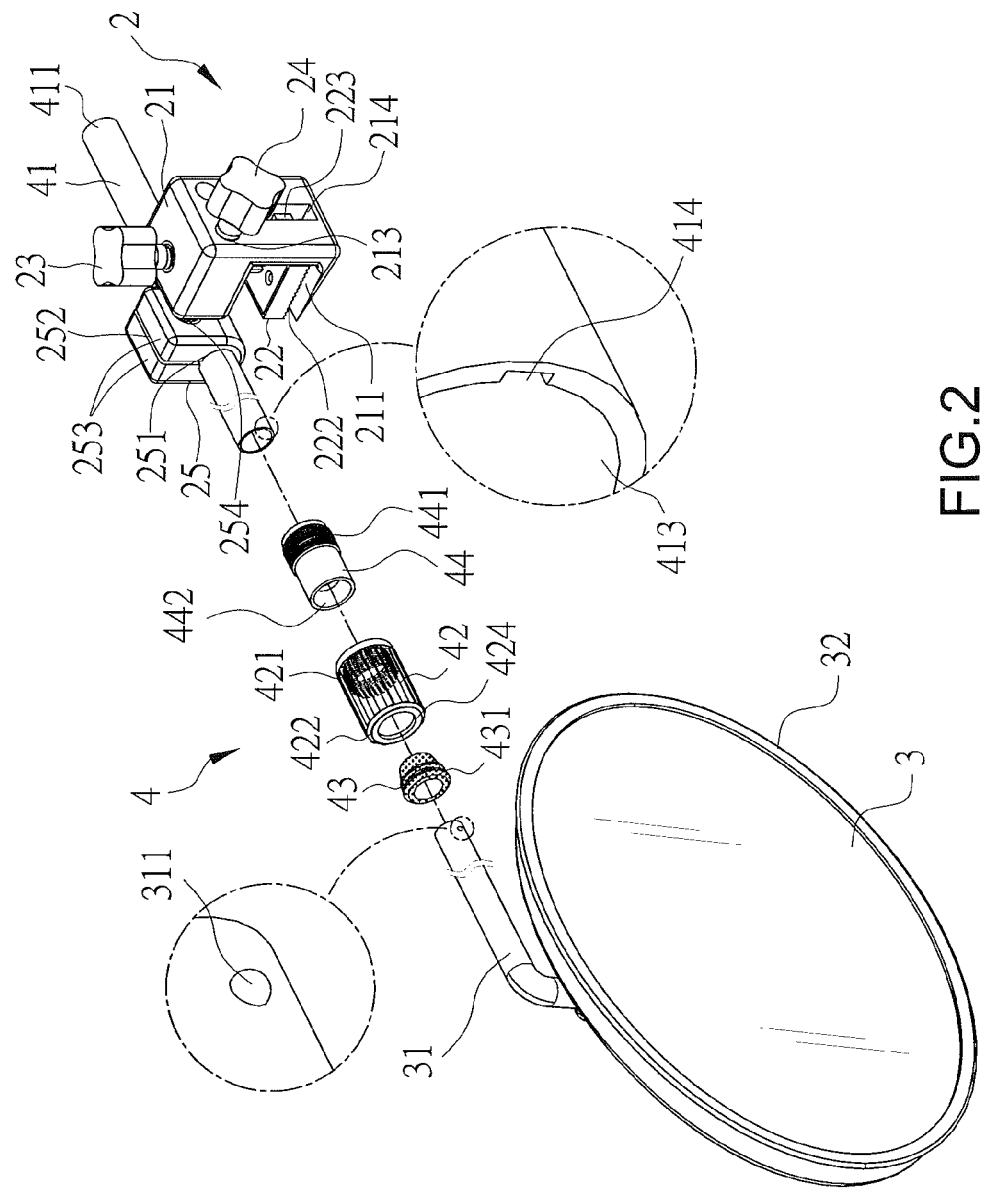
FIG. 2 is an exploded, perspective view of the auxiliary mirror device of FIG. 1.
Figure 3:
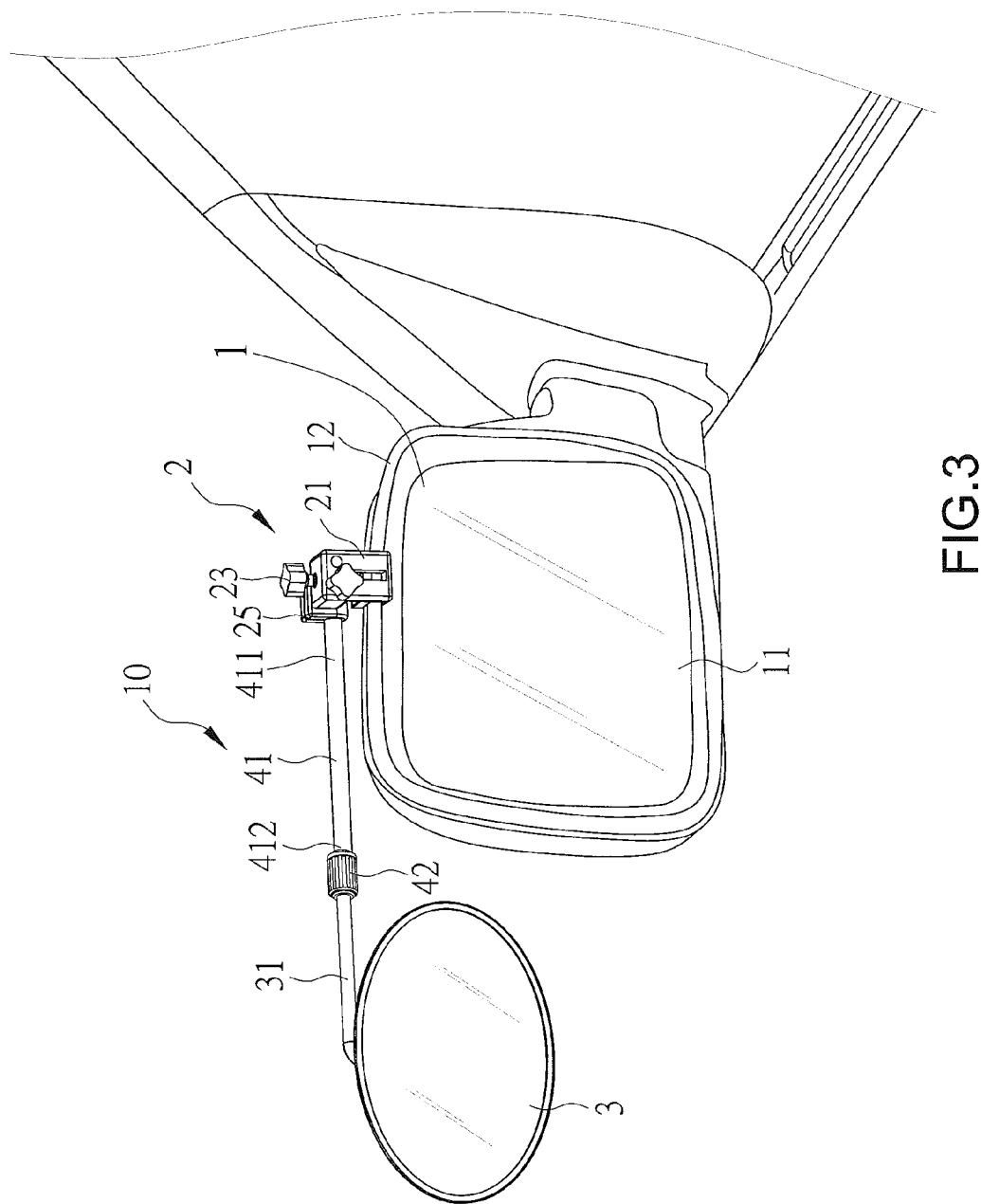
FIG. 3 shows a schematic view of the auxiliary mirror device of the present invention being installed to a vehicle side view mirror.

An auxiliary mirror device 10 for vehicles according to a preferred embodiment of the present invention is shown in FIGS. 1 through 6 of the drawings and is adapted for coupling to a vehicle side view mirror 1 to expand a driver's rear view range and to enhance the driving safety (see FIG. 3). The vehicle side view mirror 1 includes a mirror 11 and a frame 12 around the mirror 11.

The auxiliary mirror device 10 includes at least one fixation unit 2, a connection unit 4, and an auxiliary mirror 3. The fixation unit 2 is adapted to be engaged to the frame 12 of the vehicle side view mirror 1. In this embodiment, the fixation unit 2 includes a fixation base 21, a clamping member 22, and a holder base 25. The fixation base 21 includes a top wall 216, a bottom wall 217, and a lateral wall 218 connected between the top and bottom walls 216 and 217. A clamping space 211 with an opening (not labeled) is formed between the top and bottom walls 216 and 217. The top wall 216 has an outer end 219 opposite to the lateral wall 218. A vertical screw hole 212 is disposed in the top wall 216, and a first fixation member 23 (e.g. a screw) is threaded into the screw hole 212 with an inner end 231 of the first fixation member 23 extending into the clamping space 211 (see FIG. 4). In this embodiment, the inner end 231 is formed in a ball or conical shape. A transverse hole 213 is disposed in the lateral wall 218, and a second fixation member 24 (e.g. a screw) extends through the transverse hole 213 and the clamping space 211. Furthermore, an elongated vertical slot 214 is further disposed in the lateral wall 218.

Figure 4:
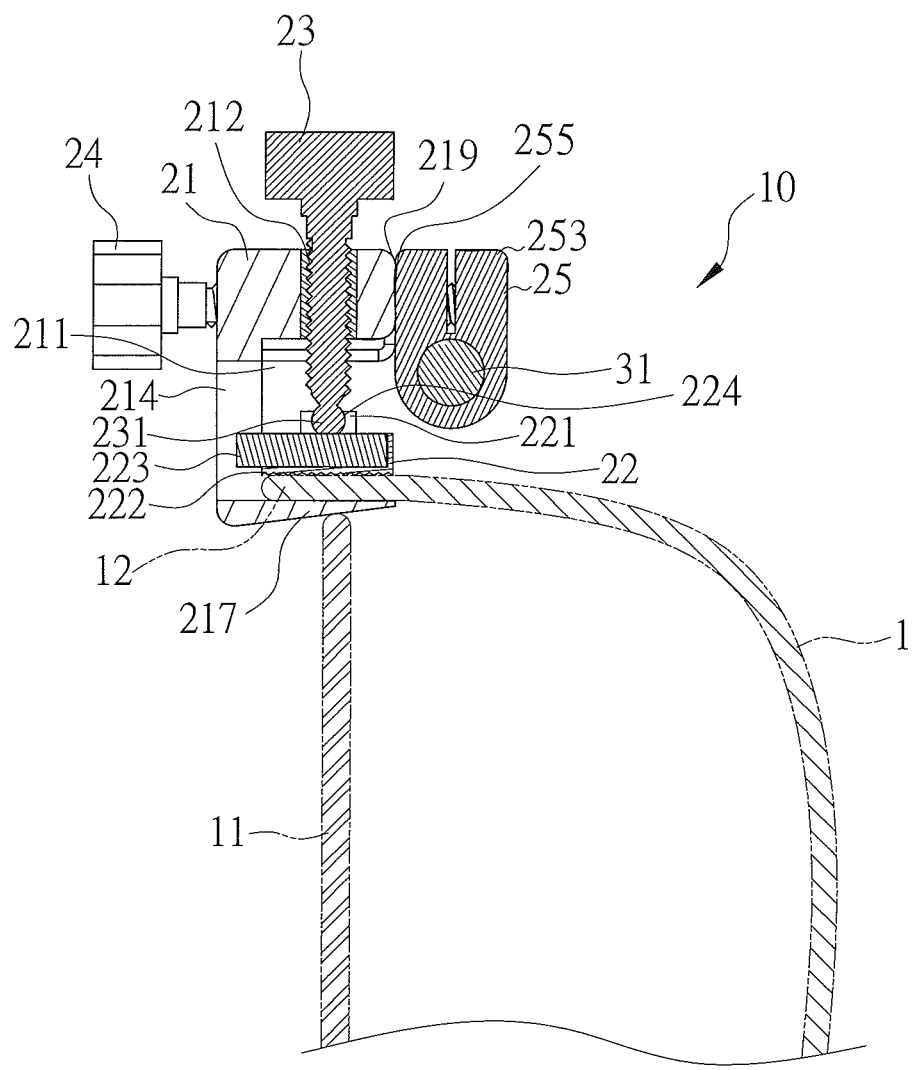
FIG. 4 is a sectional view of the auxiliary mirror device of FIG. 3 installed to the vehicle side view mirror.
Figure 5:
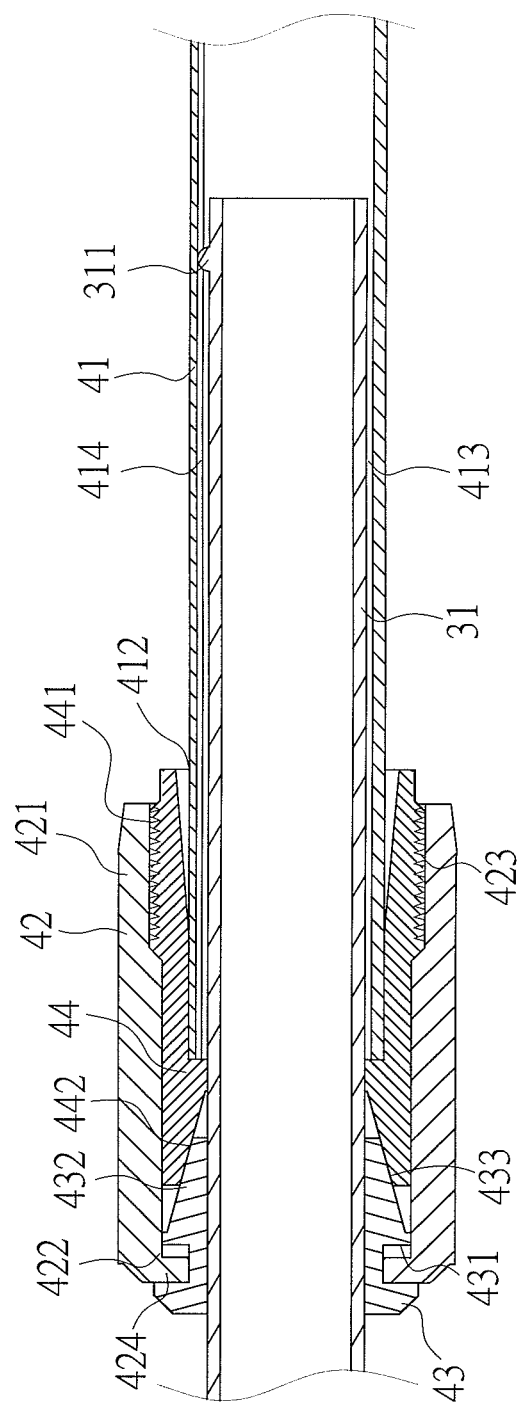
FIG. 5 is a partial, sectional view of a connection unit of the auxiliary mirror device of the present invention.
Figure 6:
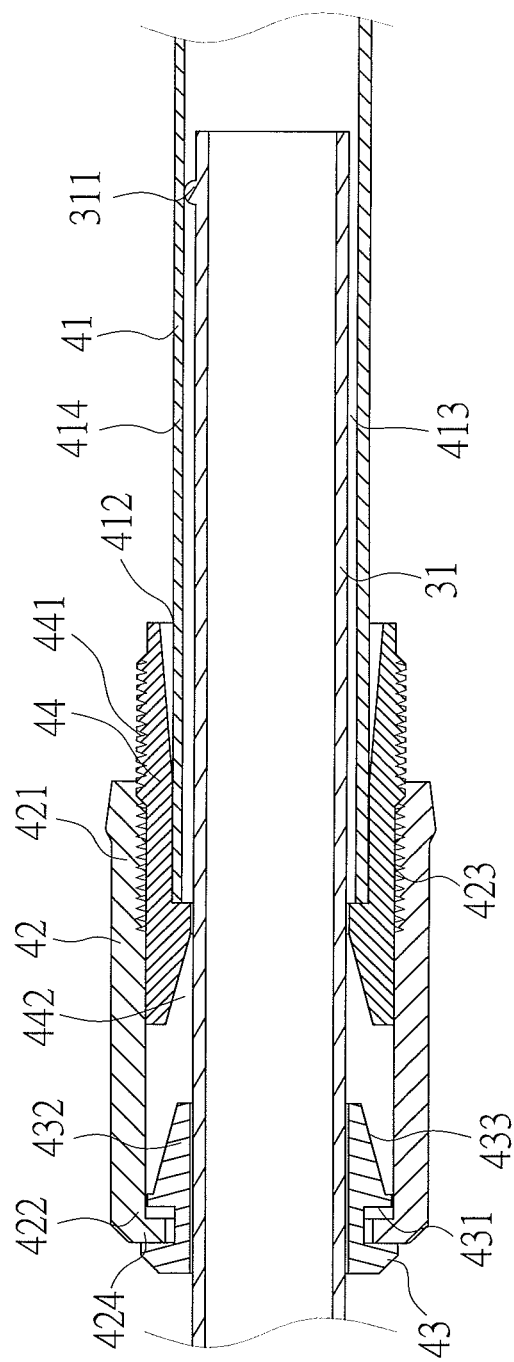
FIG. 6 shows a sectional view similar to FIG. 5, with a tightening ring moved away from a sleeve of the connection unit.

The clamping member 22 is movably accommodated in the clamping space 211 of the fixation base 21 in a vertical direction, so that the clamping member 22 and the bottom wall 217 of the fixation base 21 can be used for clamping on an upper end of the frame 12 of the vehicle rear view mirror 1, as shown in FIG. 4. A guiding portion 223 is protruded outwardly from a side of the clamping member 22 and received in the vertical slot 214 of the fixation base 21 for limiting and guiding the clamping member 22 to move vertically in the clamping space 211. An annular wall 221 is protrudingly formed on an upper face of the clamping member 22, and a recess 224 is provided inside the annular wall 221 for the inner end 231 of the first fixation member 23 to insert into correspondingly. Furthermore, an indented engaging portion 222 is disposed on a lower face of the clamping member 22.

The holder base 25 is in the form of an annular body having a through-hole 251 extending therethrough. A gap 252 in communication with the through-hole 251 is formed in the holder base 25, so that the holder base 25 includes two opposite clamping walls 253 separated by the gap 252. Two aligned coupling holes 254 are disposed in the two clamping walls 253 respectively. Each of the clamping walls 253 has a flat outer surface 255. The outer surface 255 of one of the clamping walls 253 abuts against the outer end 219 of the top wall 216 of the fixation base 21, and the second fixation member 24 extending through the transverse hole 213 is inserted and threaded into the coupling holes 254 of the holder base 25, so that the two clamping walls 253 of the holder base 25 can be forced to dispose closer to each other (i.e. a spacing of the gap 252 is reduced).

The connection unit 4 includes a connection rod 41, an adjustment barrel 42, and a tightening ring 43. The connection rod 41 includes a first section 411 and a second section 412 spaced from the first section 411 along an axis thereof. The first section 411 of the connection rod 41 is received in the through-hole 251 of the holder base 25 and clamped and fixed by the two clamping walls 253 with the second fixation member 24 threaded and locked into the coupling holes 254 of the holder base 25. A connection hole 413 is provided in the second section 412 of the connection rod 41 (see FIG. 5), and a recess 414 extending along the axis is provided in an inner wall of the connection hole 413. In this embodiment, a sleeve 44 is mounted around the second section 412 of the connection rod 41 and has a threading 441 on an outer periphery thereof. A conic slot 442 is formed in an outer end of the sleeve 44 and has an inner diameter gradually decreasing inwards. The adjustment barrel 42 is mounted around and moveable relative to the sleeve 44. The adjustment barrel 42 includes spaced first and second ends 421 and 422. A screw hole 423 is formed in the first end 421 of the adjustment barrel 42 and can be locked with the threading 441 of the sleeve 44 correspondingly. Furthermore, an annular combination rim 424 is provided on the second end 422 of the adjustment barrel 42. The tightening ring 43 is an annular body made of an elastic material such as silicone rubber and is engaged on the second end 422 of the adjustment barrel 42. In this embodiment, an annular groove 431 is provided in an outer periphery of the tightening ring 43 and engaged with the combination rim 424 of the adjustment barrel 42. The tightening ring 43 includes an inner section 432 received in the second end 422 of the adjustment barrel 42 and having a tapered outer surface 433. The outer surface 433 has a conical shape corresponding to the slot 442. When the adjustment barrel 42 is moved towards and locked with the threading 441 of the sleeve 44, the inner section 432 of the tightening ring 43 is moved into the slot 442 the sleeve 44 and tightened by the sleeve 44 (see FIG. 5). When the adjustment barrel 42 is turned away and loosen from the threading 441 of the sleeve 44, the tightening ring 43 is moved away from the slot 442 of the sleeve 44 and is not compressed by the sleeve 44 (see FIG. 6).

The auxiliary mirror 3 is provided with a supporting rod 31 disposed on a back thereof. The supporting rod 31 extends through the tightening ring 43 and the sleeve 44 and is inserted into the connection hole 413 of the connection rod 41. When the tightening ring 43 is compressed and tightened by the sleeve 44, the supporting rod 31 is clamped and fixed by the tightening ring 43 (see FIG. 5). On the other hand, when the tightening ring 43 is not compressed by the sleeve 44, the supporting rod 31 is not clamped and fixed by the tightening ring 43 (see FIG. 6), so that the supporting rod 31 can be moved relative to the connection rod 41. In this embodiment, a projection 311 is formed in a front end of the supporting rod 31 and received within the recess 414 of the connection rod 41, such that the supporting rod 31 does not rotate when the supporting rod 31 is moved relative the connecting rod 41. In addition, a mirror body 32 of the auxiliary mirror 3 relative to the supporting rod 31 is adjustable in angle.

When the auxiliary mirror device 10 of the present invention is embodied, the fixation unit 2 is coupled on the frame 12 of the vehicle side view mirror 1. More specifically, the engaging portion 222 on the lower face of the clamping member 22 and the bottom wall 217 of the fixation base 21 are used for clamping on the upper side of the frame 12 of the vehicle side view mirror 1, as shown in FIGS. 3 and 4. Then, the first fixation member 23 is operated so that the inner end 231 of the first fixation member 23 is pressed inside the recess 224 of the clamping member 22 to fix the clamping member 22 tightly. Thereby, the fixation base 21 and the clamping member 22 can be fixed on the frame 12, as shown in FIG. 4. Furthermore, a position of the auxiliary mirror 3 relative to the vehicle side view mirror 1 can be adjusted based on requirements. More specifically, after the adjustment barrel 42 is loosen, the supporting rod 31 received in the connection hole 413 of the connection rod 41 can be adjusted in length (as indicated by an arrow 5 in FIG. 7). After a required position of the auxiliary mirror 3 is adjusted, the adjustment barrel 42 can be locked with the sleeve 44 tightly again, and the supporting rod 31 will be clamped and fixed by the tightening ring 43.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An auxiliary mirror device for vehicles comprising:
a fixation unit including a fixation base and a holder base engaged with the fixation base, with the fixation base adapted for coupling on a frame of a vehicle rear view mirror, with the holder base having a through-hole;
a connection unit including a connection rod, an adjustment barrel, and a tightening ring, with the connection rod including a first section and a second section spaced from the first section along an axis of the connection rod, with the first section of the connection rod engaged in the through-hole of the holder base, with a connection hole provided in the second section of the connection rod, with a sleeve provided on the second section of the connection rod and having a threading on an outer periphery thereof, with a conic slot formed in the sleeve, with the adjustment barrel mounted around and moveable relative to the sleeve, with a screw hole formed in the adjustment barrel and lockable with the threading of the sleeve, with the tightening ring engaged on the adjustment barrel and including an inner section received in the adjustment barrel, with the inner section of the tightening ring including a tapered outer surface having a conical shape corresponding to the slot in the sleeve; and an auxiliary mirror provided with a supporting rod disposed on a back thereof, with the supporting rod extending through the tightening ring and the sleeve and retractably received in the connection hole of the connection rod, wherein when the adjustment barrel is locked with the sleeve, the inner section of the tightening ring is received in the slot the sleeve and tightened by the sleeve, wherein when the adjustment barrel is turned away and loosen from the threading of the sleeve, the tightening ring is moved away from the slot of the sleeve, and the supporting rod is moveable relative to the connection rod.

2. The auxiliary mirror device for vehicles according to claim 1, wherein a recess is provided in an inner wall of the connection hole of the connection rod and extends along the axis of the connection rod, with a projection formed in a front end of the supporting rod and received within the recess of the connection rod.

3. The auxiliary mirror device for vehicles according to claim 1, wherein an annular combination rim is provided on the adjustment barrel, with an annular groove provided in an outer periphery of the tightening ring and engaged with the combination rim of the adjustment barrel.

4. The auxiliary mirror device for vehicles according to claim 1, wherein the fixation base includes a top wall, a bottom wall, and a lateral wall connected between the top and bottom walls, with a clamping space formed between the top and bottom walls, with the top wall having an outer end opposite to the lateral wall, with a vertical screw hole disposed in the top wall, with a first fixation member threaded into the vertical screw hole, with an inner end of the first fixation member extending into the clamping space, with a transverse hole disposed in the lateral wall, with a second fixation member extending through the transverse hole and the clamping space, with a clamping member movably accommodated in the clamping space of the fixation base, with the clamping member and the bottom wall of the fixation base adapted for clamping on the frame of the vehicle rear view mirror, with an annular wall formed on an upper face of the clamping member, with a recess formed inside the annular wall and receiving the inner end of the first fixation member, with a gap in communication with the through-hole formed in the holder base, with the holder base including two opposite clamping walls separated by the gap, with two aligned coupling holes disposed in the two clamping walls respectively, with the second fixation member threaded into the two coupling holes of the holder base.

* * * * *